(12) United States Patent
Surendra et al.

(10) Patent No.: US 12,074,922 B2
(45) Date of Patent: Aug. 27, 2024

(54) COMMUNICATION SESSIONS IN CLUSTER COMPUTING ENVIRONMENT

(71) Applicant: Hewlett Packard Enterprise Development LP, Spring, TX (US)

(72) Inventors: Vijay Kamath Surendra, Karnataka (IN); Frederic Leon Huve, Isere (FR); Siddappa Nitheen Huligerepura, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/160,665

(22) Filed: Jan. 27, 2023

(65) Prior Publication Data
US 2024/0022615 A1    Jan. 18, 2024

(30) Foreign Application Priority Data

Jul. 13, 2022  (EP) ..................... 22306060

(51) Int. Cl.
| H04L 12/00 | (2006.01) |
| H04L 65/1063 | (2022.01) |
| H04L 65/1083 | (2022.01) |
| H04L 65/1104 | (2022.01) |

(52) U.S. Cl.
CPC ...... H04L 65/1083 (2013.01); H04L 65/1063 (2013.01); H04L 65/1104 (2022.05)

(58) Field of Classification Search
CPC ............. H04L 65/1083; H04L 65/1063; H04L 65/1104
USPC ....................................... 709/224
See application file for complete search history.

(56) References Cited

U.S. PATENT DOCUMENTS

| 8,259,923 | B2 | 9/2012 | Mandalia et al. |
| 8,572,326 | B2* | 10/2013 | Lowery ................... H04L 67/01 714/6.32 |
| 9,037,120 | B2 | 5/2015 | Bonner |
| 9,602,556 | B1 | 3/2017 | Cham |
| 9,942,285 | B2 | 4/2018 | Lam et al. |
| 10,015,671 | B2 | 7/2018 | Zaifuddin et al. |
| 10,044,768 | B2 | 8/2018 | Hallenstål et al. |
| 10,348,809 | B2* | 7/2019 | Bansal ................ H04L 43/0876 |
| 10,659,427 | B1 | 5/2020 | Ratcliffe et al. |
| 10,789,129 | B1* | 9/2020 | Gv ....................... G06F 11/1438 |
| 11,188,381 | B2* | 11/2021 | LaChiusa ............. G06F 11/3409 |
| 11,385,939 | B2* | 7/2022 | Wong .................... G06F 9/5044 |
| 11,394,628 | B1* | 7/2022 | Chakkassery Vidyadharan .......... G06F 11/3006 |
| 11,736,346 | B2* | 8/2023 | Narasimhan .......... H04L 67/125 709/221 |

(Continued)

FOREIGN PATENT DOCUMENTS

EP        2337298 A1    6/2011

*Primary Examiner* — Frantz Coby
(74) *Attorney, Agent, or Firm* — Hewlett Packard Enterprise Patent Department

(57) ABSTRACT

Examples of implementing a communication session within a cluster computing environment are described. In an example, a communication session, initially being established by a first application server instance is continued through a second application server instance. Thereafter, a mid-session request received from a communication network may be directed to the second application server instance, wherein the mid-session request pertains to the communication session.

20 Claims, 10 Drawing Sheets

(56) References Cited

U.S. PATENT DOCUMENTS

| | | | |
|---|---|---|---|
| 2013/0332550 A1* | 12/2013 | Sureshchandra | H04L 69/329 709/206 |
| 2017/0149913 A1* | 5/2017 | Olomskiy | H04L 51/224 |
| 2018/0124124 A1 | 5/2018 | Corona et al. | |
| 2020/0389775 A1 | 12/2020 | Ravichandran | |
| 2022/0330303 A1* | 10/2022 | Zhao | H04W 24/10 |
| 2022/0360503 A1* | 11/2022 | Seenivasan | H04L 67/50 |
| 2023/0113082 A1* | 4/2023 | Sabeur | H04L 65/1104 455/435.1 |
| 2023/0217235 A1* | 7/2023 | Badar | H04W 8/30 455/433 |

\* cited by examiner

COMMUNICATION SESSIONS IN CLUSTER COMPUTING ENVIRONMENT

CROSS REFERENCE TO RELATED APPLICATIONS

This application claims the priority benefit of EP Patent Application No. 22306060.9, filed on Jul. 13, 2022, the contents of which are incorporated herein by reference in their entirety.

BACKGROUND

Clustering allows different computing devices, or nodes, to operate together to function as a unified computing resource. These types of computing architectures include a plurality of computing nodes or servers. The nodes or servers may provide a variety of services, such as communication services. The communication services may be provided by an application server deployed onto the cluster computing environment in containers. The application server may establish and maintain a communication session between different users. Examples of such communication session may include voice communications, video calls, messaging sessions, or combinations thereof.

BRIEF DESCRIPTION OF FIGURES

Systems and/or methods, in accordance with examples of the present subject matter are now described, by way of example, and with reference to the accompanying figures, in which.

DETAILED DESCRIPTION

Figure 1:
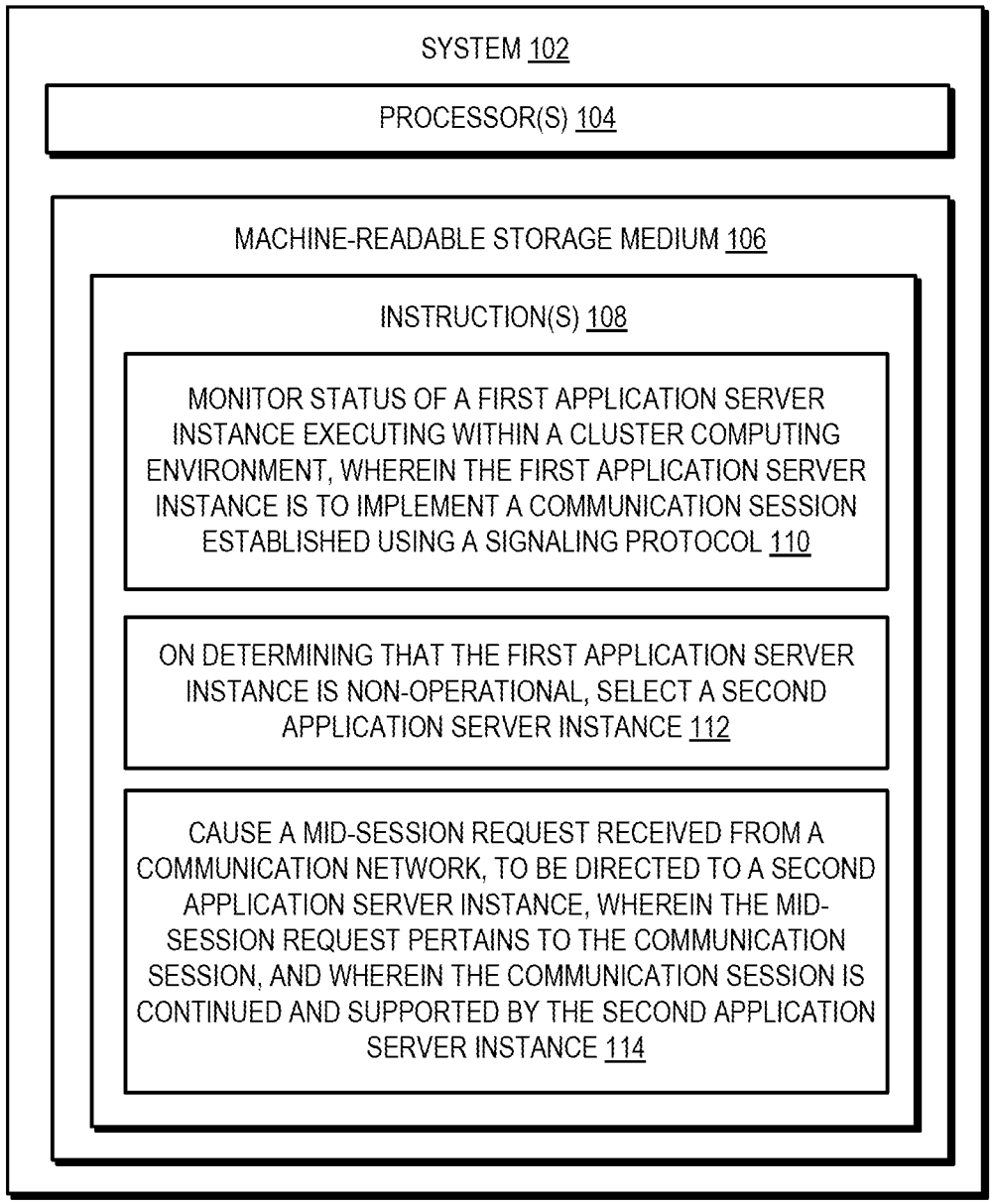
FIG. 1 illustrates a system for implementing a communication session within a cluster computing environment, as per an example.

Signalling protocol, such as the Session Initial Protocol (SIP) may be used for implementing communications sessions in communication networks. The communication session may include voice communications, video calls, messaging sessions, or combinations thereof. A communication session may be implemented onto an architectural IP-based framework using a cluster computing environment. The cluster computing environment may include a plurality of computing nodes that may be pooled together to form a singular computing resource.

Communication services may be provided by an application hosted on an application server. The application server may be deployed onto the cluster computing environment in containers. Containers may be understood as virtualized and isolated user spaces within which an instance of the application server may execute to establish a communication session. A plurality of such containers may be deployed in deployable units. A container deployed within a deployable unit may host and execute an instance of the application server. In the context of container management platforms such a deployable unit may be referred to as a pod. Similar mechanisms may also be implemented in virtualized runtime environments on different platforms.

Certain implementations may include multiple instances of application servers deployed across a plurality of deployable units. Such multiple instances of application servers may be utilized for handling a large number of communication sessions. It is possible that the number of application server instances may change to account for a change in the number of communication sessions being handled. For example, within a cluster computing environment, initiating a scale-in operation reduces the number of application server instances. This may be done in circumstances to account for a decrease in the number of communication sessions being managed. In such a case, a certain number of application server instances may be terminated with subsequent communication sessions being established and handled by the remaining application server instances which were not terminated. In a similar manner, if the number of communication session increases, the number of application server instance may be increased to account for the increase in the number of communication sessions.

An application server instance which may be handling a communication session is not removed or terminated abruptly, mid-session. If that were to happen, it may result in the termination of the ongoing communication session being managed therein. Various service requirements or regulations may mandate that certain types of communication session, such as a voice call or a video call, are to continue without disruptions. Therefore, such application server instances cannot be terminated mid-session and may be terminated once the ongoing communication session ends.

If a scale-in operation is performed, the application server instances handling the communication sessions may be managed. In such instances, a timer may be initiated, and a load balancing engine may be instructed not to use a given application server instance for establishing any new communication sessions. Once the timer expires and if the application server instance is not handling any communication session, the application server instance may be terminated. However, if the timer expires and if a communication session is still ongoing on the application server instance, the cluster computing environment may have to wait until the ongoing communication session ends since a forceful termination of the application server instance may result in an unplanned termination of any ongoing communication session handled by the application server instance. Even such cases may result in a waiting time for the ongoing communication session to end resulting in an incomplete scale-in operation. If owing to some reason the applicant server instance is forcefully terminated, it may result in the termination of the ongoing communication session as well.

Other challenges involve the handling protocol messages exchanged during communication sessions. For example, communication sessions based on signalling protocols may involve the exchange of a plurality of protocol messages, also referred to as mid-session requests. Protocol messages may refer to messages that may be exchanged between different entities in the cluster computing environment, once a communication session has been established. The protocol messages may be utilized, amongst other functions, for managing or maintaining a communication session, or for managing attributes of a communication session. For example, the mid-session requests may be used for switching an ongoing audio communication session to a video communication session.

In some examples, the protocol messages may be managed and routed by a load balancing engine implemented within the cluster computing environment. The load balancing engine may direct the protocol messages based on an identifier of the appropriate application server instance. For example, the load balancing engine may determine the identifier (e.g., a hostname or an IP address) of a target application server instance associated with the protocol messages. Based on the identifier, the load balancing engine may accordingly direct such protocol messages to the corresponding application server instance. The load balancing engine may not be able to route protocol messages to the application service instance if the application server instance is not available. Similar situations may arise if a deployable unit, onto which the application server instances are executing, has failed or is not operational.

Approaches for implementing a communication session within a cluster computing environment are described. Within the cluster computing environment, a first application server instance and a second application server instance may be executing within respective deployable units. The communication session may be initially established and managed by the first application server instance. In an example, the first application server instance may initially determine information pertaining to a state of the communication session, and a state of the application which is implementing the communication session. The communication state information and the application state information may thereafter be saved in a key-value store associated with the cluster computing environment.

It may be the case that the first application server instance may be rendered non-operational. This may arise due to a number of factors. For example, the first application server instance may be removed or terminated as a result of a scale-in operation that may have been performed. In another case, the first application server instance may have failed, or that a planned maintenance operation may have been initiated owing to which the first application server instance may no longer available. It may also be the case that the deployable unit, onto which the application server instances may have been executing, has failed.

Once it is determined that the first application server instance is no longer operational or available, the second application server instance may retrieve the communication state information and the application state information corresponding to the communication session which was earlier handled by the first application server instance. Once retrieved from the key-value store, the second application server instance may takeover and continue the communication session based on the communication state information and the application state information.

Examples are provided herein to manage and direct any subsequent mid-session requests to the appropriate application server instance. For example, the mid-session request may be handled by a load balancing engine implemented within the cluster computing environment. In an example, the load balancing engine may direct the mid-session request to the second application server instance responsive to a determination that the first application server instance is no longer operational. In an example, the load balancing engine may rely on session affinity information (which depicts association of any given communication session with any one of the application server instances) and determine to which application server instance the mid-session request under consideration is to be routed to.

The approaches as described above enable continuation of the previously established communication sessions on another application server instance (e.g., the second application server instance) when the prior application server instance managing the communication sessions is not available. In this manner, any disruptions to the ongoing communication sessions may be avoided. Furthermore, these example approaches may also be used for handling subsequent mid-session request for managing the corresponding ongoing communication session. The approaches, as discussed further, may be utilized for any communication based on a signalling protocol.

FIG. 1 illustrates a system 102 for implementing a communication session within a cluster computing environment, as per an example. The system 102 includes processor(s) 104 and a machine-readable storage medium 106 coupled to and accessible by the processor(s) 104. The machine-readable storage medium 106 stores instruction(s) 108, that are accessible by the processor(s) 104. In an example, the system 102 may be implemented as a standalone computing device which may be in communication with a plurality of computing nodes within the cluster computing environment. The processor(s) 104 may be implemented as a dedicated processor, a shared processor, or a plurality of individual processors, some of which may be shared.

The machine-readable storage medium 106 may be communicatively connected to the processor(s) 104. Among other capabilities, the processor(s) 104 may fetch and execute computer-readable instruction(s) 108, stored in the machine-readable storage medium 106. The processor(s) 104 may execute the instruction(s) 108 to host either a single virtual environment or multiple virtualized environments within which a first application server instance and a second application server instance may execute to implement communication sessions. Although explained in the context of the first application server instance and the second application server instance, the cluster computing environment may include a plurality of application server instances which may manage multiple communication sessions.

The processor(s) 104 may execute instructions 110 for monitoring a status a first application server instance. The status may be determined by a load balancing engine. A first application server instance may implement a communication session using a signaling protocol. In an example, the signaling protocol may be a Session Initiation Protocol (SIP. Continuing further, the instructions 110 may be executed to determine whether the first application server instance is operational or not. The first application server instance may be non-operational for a variety of reasons. For example, the first application server instance may be undergoing maintenance, may have experienced failure, or may have been deleted or terminated in response to initiation of a scale-in operation.

Once it is determined that the first application server instance is not available or operational, the instructions 112 may be executed to select a second application server instance. In an example, the second application server instance may be selected based on a selection parameter, such as a service name associated with the first application server instance and the service name of the other application server instances. The application server instance which is associated with the service name of the first application server instance is elected as the second application server instance. It may be noted that any other selection parameter may be used for selecting the second application server instance. Examples of the selection parameters include, but are not limited to, a predefined policy, hardware configuration of a deployable unit executing the second application server instance, availability of the second application server instance, or a combination thereof.

Once the second application server instance is determined, the instructions 114 may be executed to cause a mid-session request pertaining to the communication session to be directed to the second application server instance. In an example, the communication session was initially established and managed by the first application server instance. Since the first application server instance is not in operation, the communication session may continue and be supported by the second application server instance.

Figure 2:
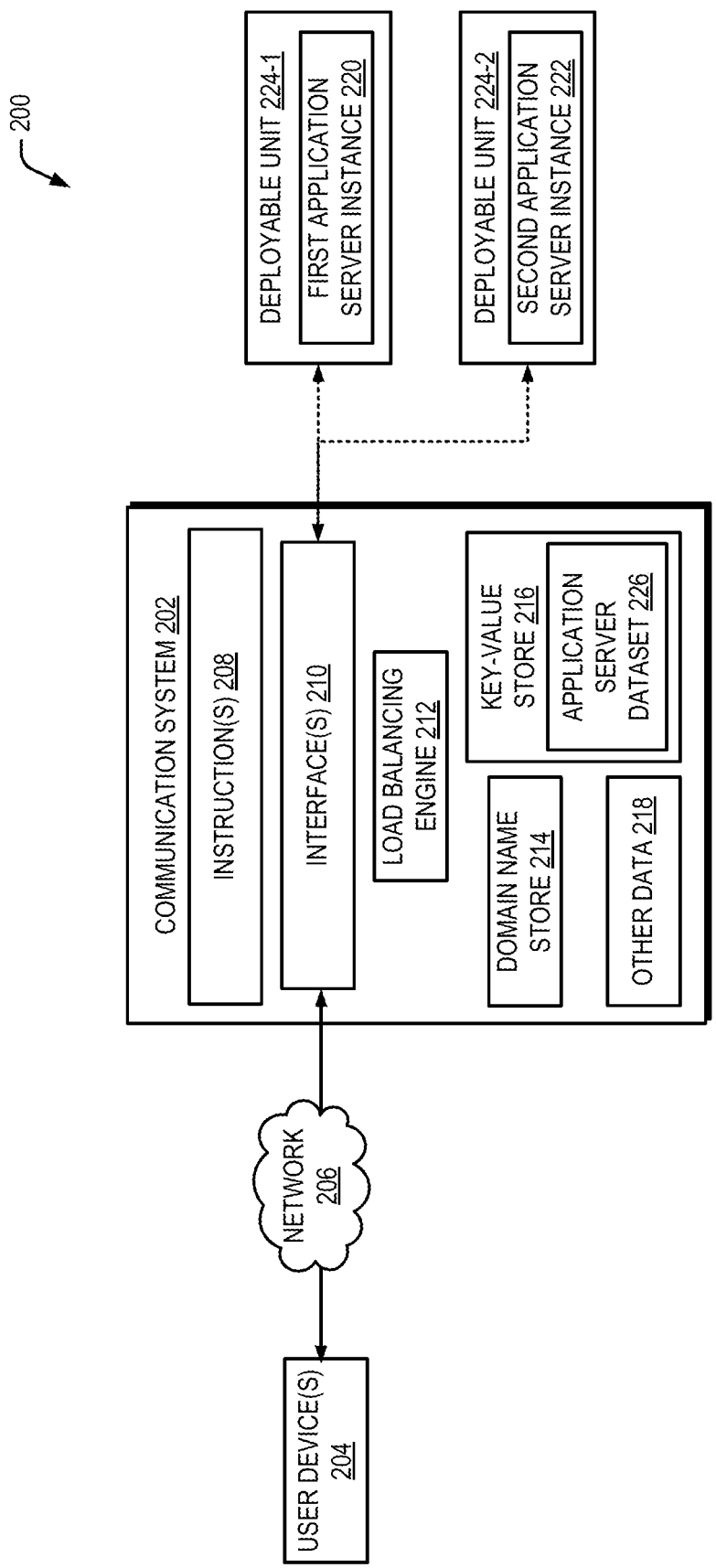
FIG. 2 illustrates a computing environment for implementing a communication session, as per an example.

FIG. 2 is a block diagram illustrating an example computing environment 200 for implementing and managing communication sessions between multiple application server instances. The computing environment 200 (hereinafter referred to as the environment 200) may be implemented in a variety of ways. For example, the environment 200 may be a cluster computing environment which may be formed by a combination of computing devices or nodes. The cluster computing environment may be utilized for hosting and executing a variety of services, for example, communication services.

The environment 200 may include a communication system 202. The communication system 202 (hereinafter referred to as the system 202) may be implemented as a server device or a standalone computing system. The system 202 may be further coupled to a plurality of user device(s) 204 through a network 206. The system 202 may receive and process requests from such user device(s) 204 based on which the system 202 may provide communication services for the user device(s) 204. The network 206 may be a private network or a public network and may be implemented as a wired network, a wireless network, or a combination of a wired and wireless network. The network 206 may also include a collection of individual networks, interconnected with each other and functioning as a single large network, such as the Internet. Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), Long Term Evolution (LTE), and Integrated Services Digital Network (ISDN).

The system 202 may further include instruction(s) 208, an interface 210, and a load balancing engine 212. The instruction(s) 208 may be similar to the instruction(s) 108 (as described in FIG. 1). In an example, the instruction(s) 208 when executed may implement either a single virtual environment or multiple virtualized environments within which multiple application server instances may be deployed. The application server instances, thus deployed, may implement communication sessions between the user device(s) 204. The interface 210 may include software implemented interfaces as well as hardware implemented interfaces that may enable the system 202 to communicatively couple with other entities within the environment 200. For example, the interface 210 may further enable the system 202 to communicate with any one or more of the user device(s) 204 through the network 206.

The load balancing engine 212 may be implemented as a combination of hardware and programming, for example, programmable instructions to implement a variety of functionalities. In examples described herein, combinations of hardware and programming may be implemented in several different ways. For example, the programming for the load balancing engine 212 may be executable instructions which are to operate and execute on the system 202. In another example, the load balancing engine 212 may include a processing resource, for example, either a single processor or a combination of multiple processors, to execute the instructions. In the present examples, the non-transitory machine-readable storage medium may store instructions, such as instruction(s) 208, that when executed by the processing resource, implement the engines. In other examples, the load balancing engine 212 may be implemented as electronic circuitry. It may be understood the system 202 may include other functional entities that manage requests pertaining to communications sessions. Such functional entities may be adapted by way of instruction(s) 208 to operate as the load balancing engine 212. In another example, the load balancing engine 212 may be implemented in addition to such functional entities. Such implementation are additional different examples of the claimed subject matter. The system 202 may further include other engines (not shown in FIG. 2) that may perform other functions of the system 202.

Continuing further, the system 202 may store information and data for implementing a communication session within a cluster computing environment. For example, the system 202 may include a domain name store 214, key-value store 216 and other data 218. Other data 218 may include data that is either generated or may be used by the system 202 during the course of its operation. The environment 200 may further include a first application server instance 220 and a second application server instance 222. The first application server instance 220 (referred to as the first instance 220) and the second application server instance 222 (referred to as the second instance 222) are instances, in an example, of an application for handling and implementing communication functions within the environment 200. The first instance 220 and the second instance 222 may be receiving and processing communications requests from any multiple user device(s) 204, based on which either a single or multiple communication sessions may be established.

In an example, the load balancing engine 212 may determine whether any new communication requests are to be routed to the first instance 220 or to the second instance 222. The load balancing engine 212 may consider existing traffic, number of communication sessions which are being handled, or other factors to make the aforementioned determination. These factors may be configured by way of programmed instructions within the load balancing engine 212 or may be user defined. For example, the load balancing engine 212 may select one of the application server instances (say first instance 220) based on a round-robin protocol. In another example, the selection may be based on predefined policies configured based on multiple parameters. The selection may be based on hardware configuration of the deployable units on which the application server instances may be have deployed. In this manner, a number of other parameters, such as availability, or load on the deployable units, or combination of such other factors may be relied on for selecting the application server instance (i.e., the first instance 220).

Although FIG. 2 depicts the first instance 220 and the second instance 222, the environment 200 may include a plurality of other application server instances, without deviating from the scope of the present subject matter. The first instance 220 and the second instance 222 may be implemented within deployable units 224-1 and 224-2, respectively. The deployable units 224-1 and 224-2 (collectively referred to as units 224) may be considered as providing an isolated execution environment for the first instance 220 and the second instance 222. The isolated execution environment may be provided by way of specific and/or dedicated hardware devices. Such dedicated hardware may include hardware resources, such as servers, disks, operating systems, software packages, and so forth, that may be available for either the first instance 220 and the second instance 222. The units 224 may also be implemented in the form of virtual machines or other example virtualization mechanisms. The virtual machines may provide the execution environment for the first instance 220 and the second instance 222.

In yet another example, the units 224 may be implemented through a container-based management platform. As may be understood, a container may be considered as a self-contained isolated execution environment for applications, wherein which the applications may be packaged. Each container may share an operating system kernel, along with binaries, libraries, and other functional components that may be utilized for enabling the execution of the applications. Within such containers, multiple instances of the applications may execute. Similarly, multiple containers may be implemented within the environment 200. Examples of container-based management platforms include, but are not limited to, Docker® container management platform, and Kubernetes® container management platform.

The system 202 may implement communication sessions using the first instance 220 and the second instance 222. As will be explained further, the system 202 may cause a communication session to continue on a different instance, even if the application server instance which may have previously established the communication session is no longer operational. The application server instance may be rendered non-operational due to failure, maintenance, or due to initiation of a scale-in operation that may result in the termination of a number of application server instances. In some examples, the application server instances may become non-operational if the deployable unit onto which they are implemented itself fails. Such events may also lead to the termination of the application server instances and the communication session under consideration.

Further aspects of the current subject matter are explained with respect a communication session that may have been initially established by the first instance 220. It is possible that the first instance 220 may not be available, may have been rendered non-operational, or may have failed. Once the first instance 220 is no longer available to handle the already established communication session, the load balancing engine 212 may cause the communication session to continue and be managed by the second instance 222. To this end, the second instance 222 may obtain information from an application server dataset 226. The information obtained from the application server dataset 226 may include information pertaining to the communication session state and the application state. As will be explained further, the second instance 222 may utilize the information from the application server dataset 226 to takeover and continue and support the ongoing communication session. In an example, the load balancing engine 212 may also manage and route any mid-session requests or messages that may be received from the user device(s) 204 to the second instance 222 in the event that the first instance 220 has failed or is no longer operational.

Figure 3:
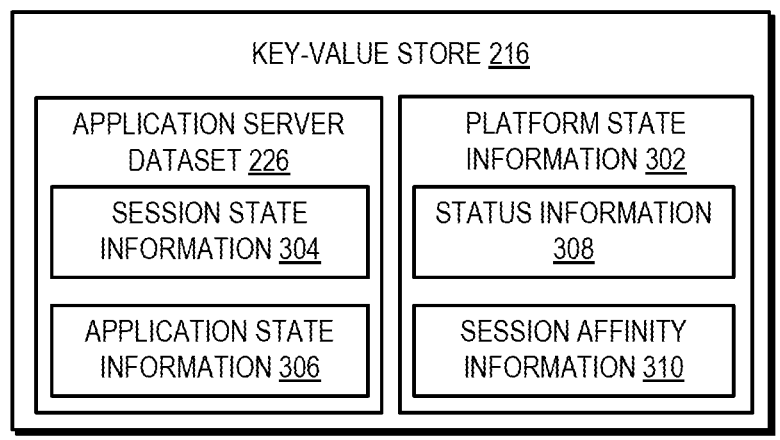
FIG. 3 illustrates example blocks of a key-value store, as per an example.

FIG. 3 depicts information blocks of other data elements constituting the key-value store 216 as introduced in FIG. 2. The example data elements of the key-value store 216 enable the second instance 222 to continue and support the ongoing communication session. As illustrated, the key-value store 216 may include the application server dataset 226 and the platform state information 302. As described previously, the application server dataset 226 may include information pertaining to the state of the communication session and state of the application. In an example, the communication session state may be stored as session state information 304 while the application state information may be stored as application state information 306.

The platform state information 302 may further include information pertaining to the status of the platform onto which one or more application server instances may be deployed. For example, the platform state information 302 may depict status information 308 of the first instance 220 and the second instance 222, depending on whether they are active, have failed, or are not available. In another example, the platform state information 302 may also include session affinity information 310. Session affinity information 310 depicts an association of any given communication session with any one of the application server instances.

Figure 4:
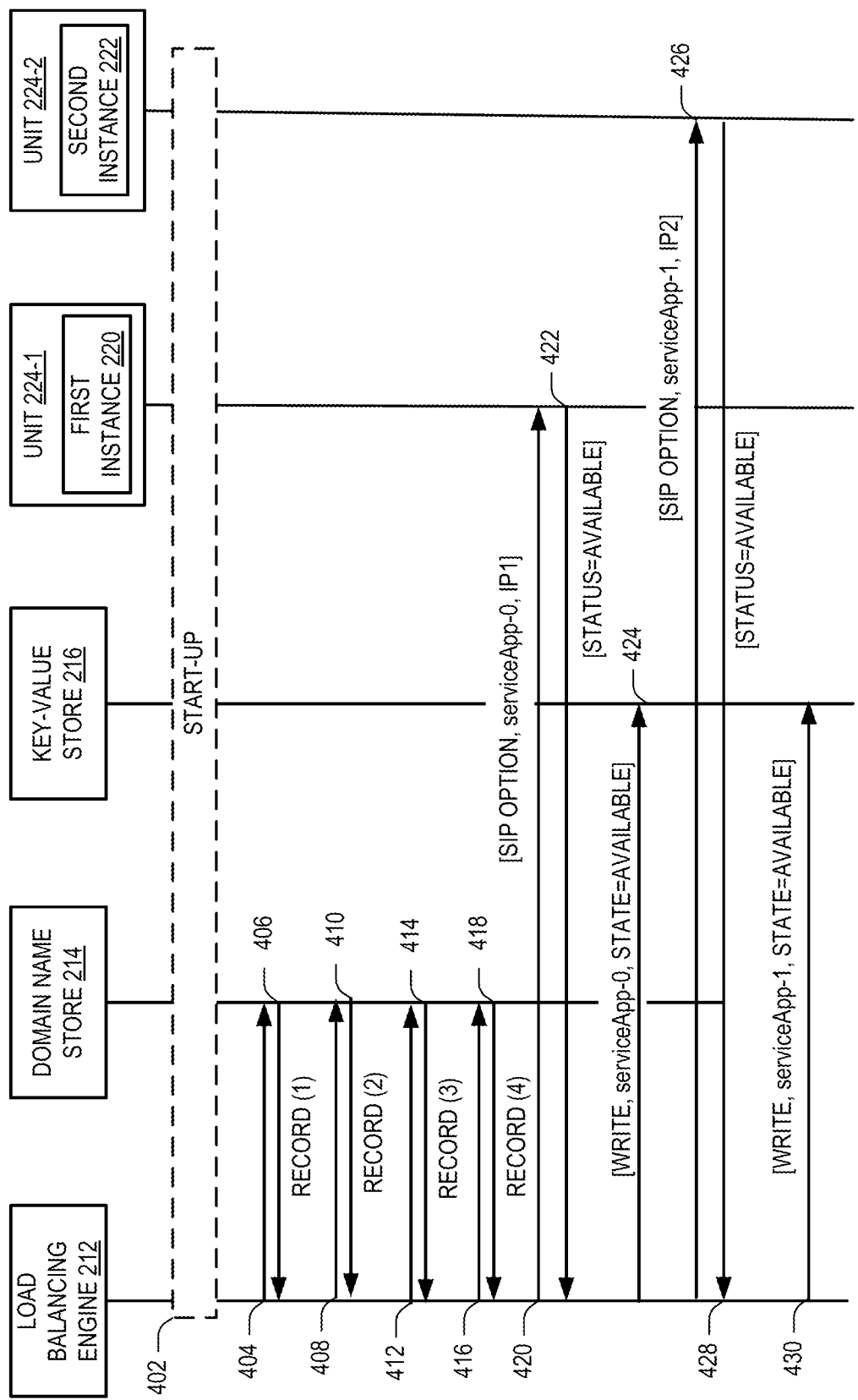
FIGS. 4-6 are flow diagrams depicting various examples for implementing a communication session within a cluster computing environment.
Figure 5:
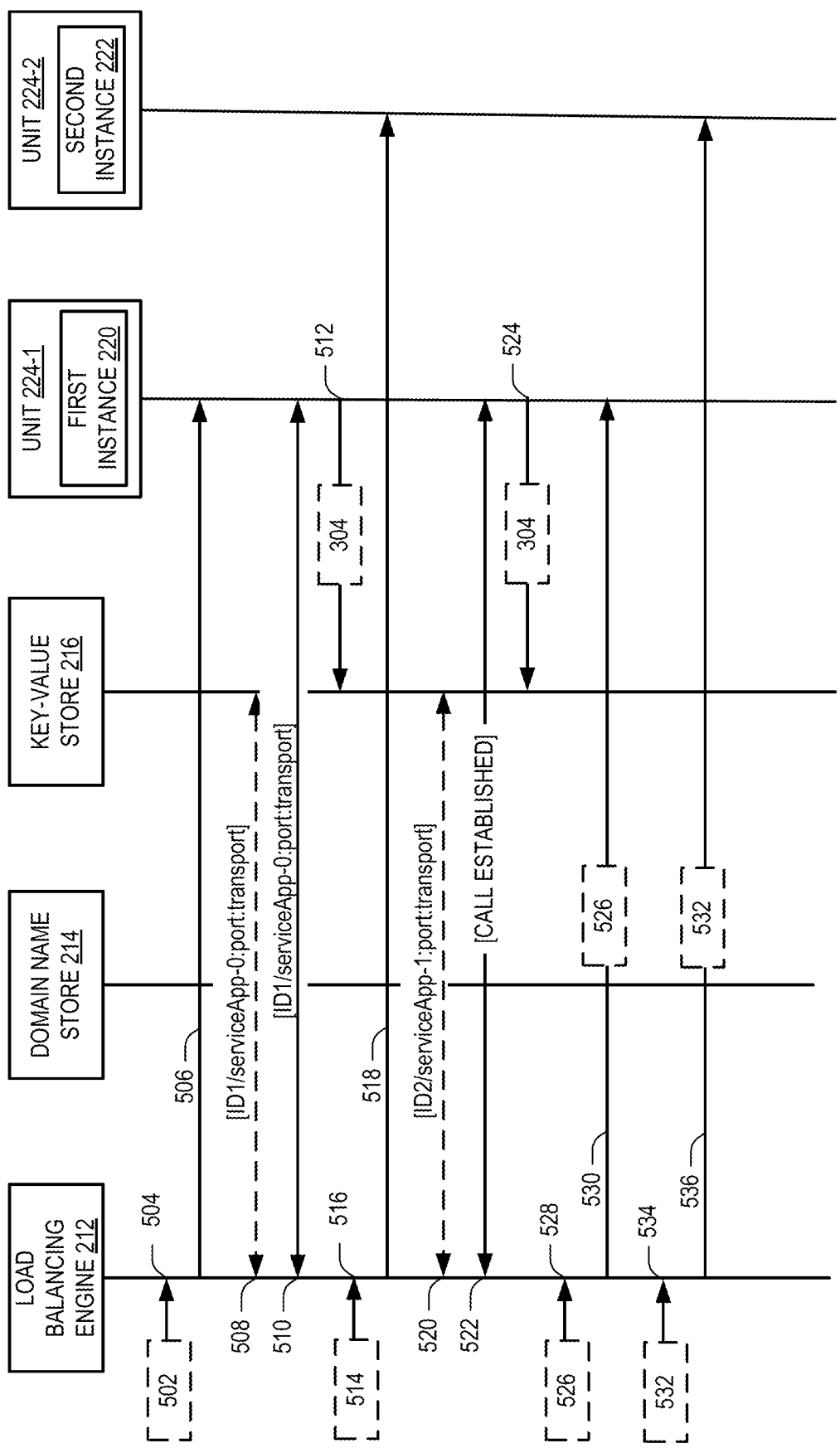
Figure 6:
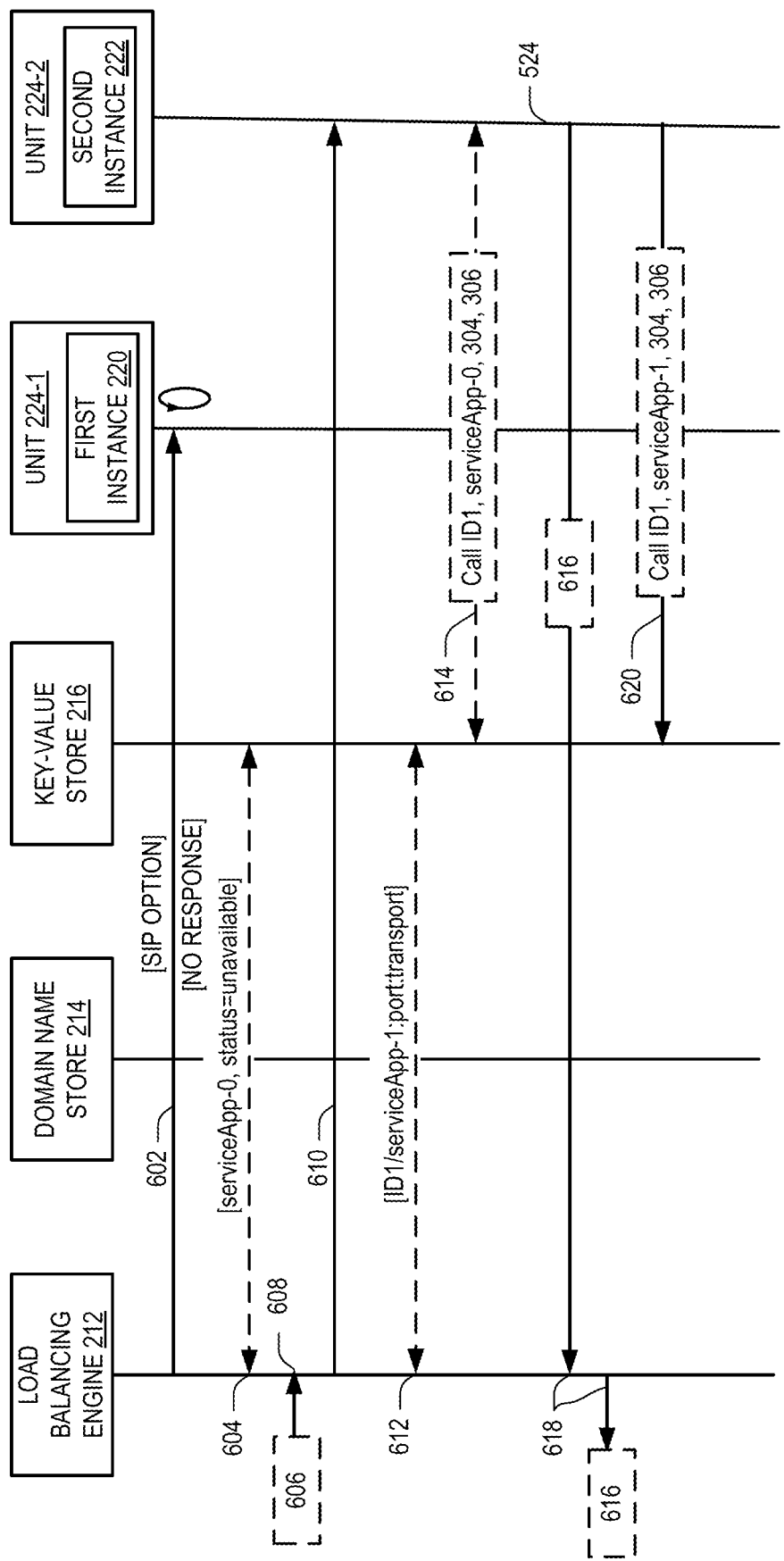

These and other aspects are further described in conjunction with sequence diagrams illustrated in FIGS. 4-6. The sequence diagrams are to depict various steps implemented between various entities of the environment 200 as shown in FIG. 2, such as the load balancing engine 212, domain name store 214, the key-value store 216, the first instance 220 and the second instance 222. For example, FIG. 4 depicts a series of steps depicting the deployment of the first instance 220 and the second instance 222. The first instance 220 and the second instance 222 are executed or deployed within deployable units 224-1 and 224-2, respectively. The deployable units 224 may also be commonly referred to as pods, e.g. on a container management platform.

Along with the first instance 220, the second instance 222, the load balancing engine 212, domain name store 214, and the key-value store 216 may be deployed. When deployed, the first instance 220 and the second instance 222 may be mapped to a communication service. In an example, the mapping of the first instance 220 and the second instance 222 to the communication service may be achieved by associating a service name with the first instance 220 and the second instance 222.

In the current explanation and in the sequence diagrams, the service name is depicted by way of a name, serviceApp. It may be noted that the communication services may be implemented on the first instance 220 and the second instance 222 as service instances. For the serviceApp, the first instance 220 and the second instance 222 may be represented as serviceApp-0 and serviceApp-1. As may be understood, the serviceApp-0 and serviceApp-1 may be considered as separate instances of the serviceApp which are implemented as application server instances. The execution of the serviceApp-0 or the serviceApp-1 would establish the communication session, which in some examples may be an incoming voice call, video calls, incoming messages as part of a messaging session, or combination thereof.

Once the service name is mapped to the first instance 220 and the second instance 222, corresponding information pertaining to different instances of the services may be provided to the domain name store 214. The mapping information may be stored and available in the form of service records. In an example, the service records provide location information of the application server instance to which the service instance may be associated with. Examples of such location information may include, but is not limited to, hostname and the port number through which the deployable units 224-1 and 224-2, may be accessed. In an example, the service records may further include an IP address which may be mapped to the hostname of the application server instance. In the context of the example service name serviceApp, the corresponding service records in the domain name store 214 may appear as follows:

serviceApp-0, Port, HostName [record (1)]
    serviceApp-1, Port, HostName [record (2)]
        serviceApp-0, IP1, . . . [record (3)]
        serviceApp-1, IP2, . . . [record (4)]

Records (1) and (2) depict the association of the service instances serviceApp-0 and serviceApp-1 with the respective port information of the deployable unit 224-1 and deployable unit 224-2, onto which the serviceApp-0 and serviceApp-1 may be executing. In an example, the record (1) and record (2) may be a DNS service (SRV) records or DNS SRV records in the context of SIP based communication. The DNS SRV records may specify a host or port for specific communication services, such as voice call. In a similar manner, the records (3) and (4) depict the association of the service instances with an IP address of the deployable units 224-1 and 224-2, that may be utilized for resolution of hostnames as indicated in the records (1) and (2). In an example, the records (3) and (4) may be service (SRV) A records in the context of SIP based communication, with the SRV A records indicating an IP address of the deployable units 224.

As depicted in FIG. 4, at start-up or initiation of communication services (at step 402), the load balancing engine 212 may initially refresh its information based on the information which may be available within the domain name store 214. To this end, the load balancing engine 212 may query (e.g., by way of DNS SRV query and DNS A query) the domain name store 214 based on the service name, e.g., serviceApp, of the communication service that is to be implemented on the environment 200. As discussed above, the domain name store 214 is to store information of the different service instances that would be executed for enabling the communication session. In the present example, the domain name store 214, when queried based on the service name serviceApp, may return the following service records for the service instances that have been registered therein, at steps 404-418:

serviceApp-0, Port, HostName [record (1)]
    serviceApp-1, Port, HostName [record (2)]
        serviceApp-0, IP1, . . . [record (3)]
        serviceApp-1, IP2, . . . [record (4)]

Once the service records (1), (2), (3), and (4), are obtained, the load balancing engine 212 may generate and transmit one or more protocol messages to the corresponding application server instance to determine their respective status. For example, at step 420, the load balancing engine 212 may query the first instance 220 executing within deployable unit 224-1 for its status. In the context of SIP, the query may, by way of SIP OPTION request sent to IP address IP1 (i.e., the IP address corresponding to the deployable unit 224-1). In response to the query received from the load balancing engine 212, the first instance 220 may respond with its operational status (at step 422). Once the status of the first instance 220 is received (e.g., available), the load balancing engine 212 may write the same to the key-value store 216 (at step 424). In a similar manner, the load balancing engine 212 may query the status of the second instance 222 (steps 426-430), and accordingly update the state of the second instance 222 as available. It may be noted that these different steps are provided with respect to first instance 220 and second instance 222 for purposes of explanation. Similar steps may be repeated for any number of application server instances which may be present within the environment 200.

With the information available with the load balancing engine 212, the domain name store 214 and the key-value store 216 updated, the system 202 may begin accepting new call requests, say from any one or more of the user device(s) 204 through the network 206. FIG. 5 depicts various steps that may implemented when a new call request is received by the load balancing engine 212. In an example, a first call request 502 may be received by the load balancing engine 212, at step 504. The first call may be associated with a first identifier. Once received, the load balancing engine 212 may select one instance from amongst the first instance 220 and the second instance 222 for establishing a communication session, at step 506. The load balancing engine 212 may elect one of the application server instances based on a predefined logic or based on a round robin mechanism. In the present example, the load balancing engine 212 elects the first instance 220.

On selecting the first instance 220, the load balancing engine 212 may link the first call with the service instance serviceApp-0 and update the corresponding session affinity information 310, at step 508. In an example, the load balancing engine 212, to link the first call with the serviceApp-0, may associate the identifier (e.g., ID1) of the first call with the service record corresponding to the serviceApp-0. Once the first call is linked with the service records of serviceApp-0, the load balancing engine 212 may update session affinity information 310 in the key-value store 216. In an example, the load balancing engine 212 may update the session affinity information 310 based on the linking of the first call and the service records of the serviceApp-0. As may be understood, session affinity information depicts binding of any communication session to a given resource (e.g., an application server instance). In this manner, any subsequent requests or messages pertaining to the communication session under consideration would be directed to the application server instance.

With the session affinity information 310 updated, the communication session comprising the first call may be established (as shown in step 510) by the serviceApp-0. Once the communication session is established, the first instance 220 may write the session state information 304 and the application state information 306 into the key-value store 216 (at step 512).

Similar steps (i.e., steps 516-524) may be implemented for a second call. For example, the second call request 514 (which may be associated with a second identifier, say ID2) may be received by the load balancing engine 212, at step 516. Once received, the load balancing engine 212 may select the second instance 222 for establishing a communication session, at step 518. Thereafter, the load balancing engine 212 may link the second call with the serviceApp-1 by associating the identifier of the second call with the service record corresponding to the serviceApp-1 and update its corresponding session affinity information (at step 520). For example, the load balancing engine 212 may update session affinity information in the key-value store 216 based on the linking of the second call and the service records of the serviceApp-1. With the session affinity information 310 updated, the communication session comprising the second call may be established (as shown in step 522) by the second instance 222. Once the communication session is established, the serviceApp-1 may write the session state information 304 and the application state information 306 corresponding to the second call into the key-value store 216 (at step 524).

Subsequent mid-session requests pertaining to one of the first call and the second call may be monitored and received by the load balancing engine 212 and routed to the appropriate application server instance in the corresponding deployable unit. For example, a mid-session request 526 pertaining to the first call may be received by the load balancing engine 212 (at step 528). The load balancing engine 212 may, based on the first identifier obtained from the mid-session request, identify the mid-session request 526 to correspond to the first call. Once details of the first call are received, the load balancing engine 212 may query the key-value store 216 for the session affinity information 310. On determining from the session affinity information 310 that the first call (i.e., the communication session to which the mid-session request pertains to) is managed by the first instance 220, the load balancing engine 212 may direct the mid-session request 526 to the first instance 220, i.e., the serviceApp-0 (at step 530). In a similar manner, the load balancing engine 212 may route a mid-session request 532 for the second call to the second instance 222, i.e., the serviceApp-1 (as depicted in steps 534-536). As will be further discussed, in another example, the load balancing engine 212 may be used for transferring and continuing an ongoing communication session from one application server instance to another, in the event that the application server instance is no longer functional.

FIG. 6 depicts the various steps that may implemented when one of the application server instances which may be executing within the environment 200 is no longer operational. As described previously, an application server instance may become non-operational owing to a failure of the deployable unit onto which the application server instance may be executing. It may also occur if the deployable unit is terminated for maintenance or in case of a scale-in operation. The present steps are explained with the respect to the first call and the second call (as were discussed in conjunction with previous examples). As described earlier, the first call may have been established and maintained by the first instance 220 (serviceApp-0), whereas the second call was established and maintained by the second instance 222 (serviceApp-1). It may be noted that additional number of calls or other types of communication sessions may be handled in a similar manner, without limiting the scope of the claimed subject matter.

It may be the case that the deployable unit 224-1 fails resulting in the termination of the serviceApp-0. As discussed previously, the serviceApp-0 may be terminated in case of other events, such as a scale-in operation. In this example, the load balancing engine 212 may monitor the deployable unit 224-1 and based on the monitoring may determine that the first instance 220 is no longer available (at step 602). To this end, the load balancing engine 212 may transmit multiple SIP OPTION messages to the deployable unit 224-1. On determining that no messages are received in response to the SIP OPTION message, the load balancing engine 212 may conclude that the first instance 220 (i.e., the serviceApp-0) is no longer active or no longer available. It may be noted that SIP OPTION used for determining the status of the deployable unit 224-1 and the first instance 220 is one of the example approaches that may be used in SIP-based communications for ascertaining whether the first instance 220 is available. Other mechanisms may also be used without deviating from the scope of the present subject matter.

Once the load balancing engine 212 determines that the first instance 220 is not available, it may update the status of the first instance 220 (i.e., the serviceApp-0) in the key-value store 216 as unavailable (at step 604) in the key-value store 216. Thereafter, the load balancing engine 212 may continue monitoring for any mid-session requests, such as the mid-session request 606 that may pertain to the first call (at step 608). To this end, the load balancing engine 212 may determine the ongoing call to which the received mid-session request corresponds to. In an example, the load balancing engine 212 may process the mid-session request and determine, based on the call identifier included therein, that the mid-session request corresponds to the first call.

Since the deployable unit 224-1 on which the serviceApp-0 was executing is no longer available, the load balancing engine 212 may determine any other functional application server instance which may be used for processing the received mid-session request and for managing the ongoing first call. To this end, the load balancing engine 212 may identify such other application server instance based on a selection parameter. If attributes of such another functional application server instance conform to the selection parameter, the application server instance may be selected. Examples of selection parameter include, but are not limited to, service name of a service implementing the communication session, a predefined policy, hardware configuration of a deployable unit executing the second application server instance, availability of the second application server instance, or a combination thereof. The example as illustrates in FIG. 6 is explained with respect to service name for sake of explanation. For example, the load balancing engine 212 may identify a functional application server instance based on the service name of which corresponds to the terminated instance, i.e., the serviceApp-0. For example, the load balancing engine 212 may query its own local cache to identify the second instance 222, i.e., the serviceApp-1 (having the service name as serviceApp) as available for handling the first call and any corresponding mid-session requests.

Once the second instance 222, i.e., the serviceApp-1 is determined as available, the load balancing engine 212 may direct the first call to the available instance serviceApp-1 (at step 610). In an example, the load balancing engine 212 may direct the first call to the serviceApp-1 based on the IP address information that may have been available with the load balancing engine 212. Since the first call was initially handled by serviceApp-0, the serviceApp-1 would not recognize the first call nor would it be in a position to process any corresponding mid-session requests owing to the absence of a communication session context. The communication session context may be considered present if communication state information and the application state information corresponding to a communication session are available to an application server instance. Consequently, if the communication state information and the application state information are not available, the application server instance would not be able to create the communication session context and continue the communication session which may had been established earlier. In the present example, once the call is directed to serviceApp-1, the load balancing engine 212 may update the session affinity information 310 of the current communication session in the key-value store 216 (at step 612).

Thereafter, the serviceApp-1 may retrieve the session state information 304 and the application state information 306 corresponding to the first call from the key-value store 216 (at step 614). Based on the session state information 304 and the application state information 306, the serviceApp-1 is able to recreate the communication session context corresponding to the first call. Thereafter, the serviceApp-1 is able to takeover and continue the first call.

Once the first call continues from the serviceApp-1, the deployable unit 224-2 (on which the serviceApp-1 is executing) may provide a signaling protocol response 616 to the load balancing engine 212, which in turn may be provided to network 206 and to user device(s) 204 through the network 206 (at step 618). Subsequently, the key-value store 216 may be updated with session state information 304 and the application state information 306 of the communication session of the first call by associating the session state information 304 and the application state information 306 of the first call with the second instance 222. Once updated, the serviceApp-1 may write the session state information 304 and the application state information 306 corresponding to the first call to the key-value store 216 (at step 620). In an example, the serviceApp-1 may store the session state information 304 and the application state information 306 for the first call in a local cache of the deployable unit 224-2. Storing the session state information 304 and the application state information 306 within the local cache allows the serviceApp-1 to process any subsequent m id-session requests corresponding to the first call. The mid-session requests thus received by the serviceApp-1 may be used for managing the first call (which was earlier established by the serviceApp-0). In an example, the mid-session requests may be utilized for managing or maintaining the first call, or for managing attributes of the first call. For example, if the first call is an audio call, the mid-session requests may be used for switching an ongoing first call from audio communication session to a video communication session, or vice versa.

As discussed above, any ongoing communication session (e.g., the first call) may continue from the other application server instance (e.g., the second instance 222) in the event that the deployable unit 224-1 or the first instance 220, are no longer active. In an example, the deployable unit 224-1 may be associated with a timer. Once the timer expires, the deployable unit 224-1 (and in turn the first instance 220) would terminate, making the first call susceptible to termination. In this case, when the timer expires, the first call may be continued from any other available application server instance (e.g., the second instance 222) based on the session state information 304 and the application state information 306 corresponding to the first call. It may be noted that these example approaches, although discussed with respect to deployable unit 224-1 and deployable unit 224-2 (and first instance 220 and second instance 222) may also be implemented for multiple other deployable units (and corresponding application server instances) without limiting the scope of the current subject matter.

The above discussed steps may be implemented in different combinations or in different orders. These steps may be implemented for various scenarios. For example, similar approaches may be adopted in instances where the application server instances, such as the first instance 220, has been terminated as a result of a scale-in operation, or any one of the deployable units 224 has failed. In one example, the load balancing engine 212 may restart the failed deployable unit (say the deployable unit 224-1) and reinitiate the serviceApp-0. In such instances, the deployable unit 224-1 may be provided with a new IP address. The new IP address for the deployable unit 224-1 may then be recorded in service records in the domain name store 214 for the communication service under consideration. Thereafter, any mid-session request for the ongoing communication session may be directed to the appropriate application server instance, i.e., the serviceApp-0. Since the serviceApp-0 had been reinitiated, the serviceApp-0 may fetch the session state information 304 and the application state information 306 corresponding to the first call from the key-value store 216. Based on the retrieved session state information 304 and the application state information 306, the load balancing engine 212 may recreate the communication session context to continue the first call, but now from the serviceApp-0.

Figure 7:
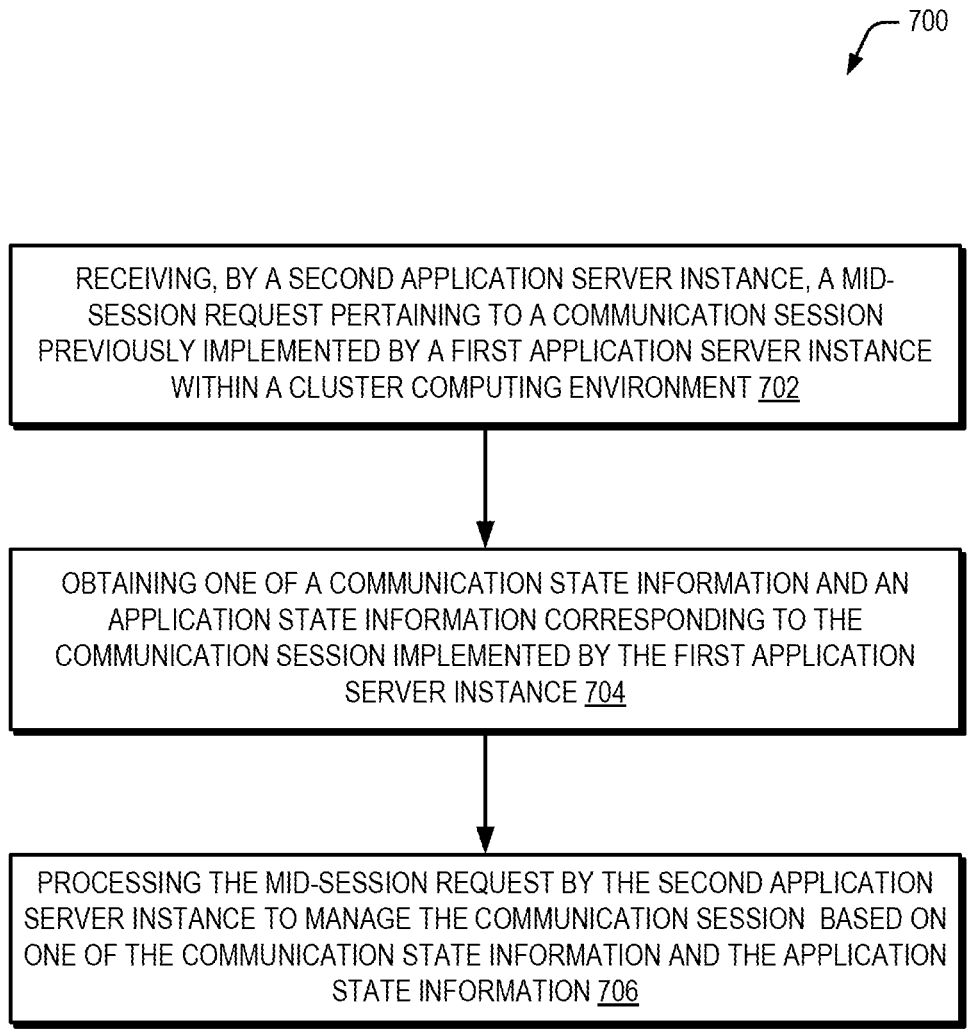
FIGS. 7-9 illustrates various example methods for implementing a communication session within a cluster computing environment.

FIG. 7 illustrates a method 700 for implementing a communication session within a cluster computing environment, as per another example. The order in which the above-mentioned methods are described is not intended to be construed as a limitation, and some of the described method blocks may be combined in a different order to implement the methods, or alternative methods. Furthermore, the above-mentioned methods may be implemented in any suitable hardware, computer-readable instructions, or combination thereof. The steps of these methods may be performed by either a system under the instruction of machine executable instructions stored on a non-transitory computer readable medium or by dedicated hardware circuits, microcontrollers, or logic circuits. For example, the method 700 may be performed by the system 202 within the environment 200. Herein, some examples are also intended to cover non-transitory computer readable medium, for example, digital data storage media, which are computer readable and encode computer-executable instructions, where said instructions perform some or all of the steps of the above-mentioned method.

At block 702, a mid-session request pertaining to an ongoing communication session may be received by a second application server instance. In an example, the ongoing communication session was previously established by a first application server instance within a cluster computing environment. For example, the mid-session request may be for a first call, wherein the first call may have been established by serviceApp-0 (i.e., the first instance 220). In the current example, the serviceApp-0 may no longer be active or may have been scaled-in. Since the serviceApp-0 is no longer active, the load balancing engine 212 on receiving the mid-session request pertaining to the first call, may route the same to another available application server instance such as the serviceApp-1 (i.e., the second instance 222).

At block 704, communication state information and an application state information corresponding to the communication session implemented by the first application server instance may be obtained. For example, the serviceApp-1 in receipt of the mid-session request may not be able to process the same since the first call was not handled by it. To process the mid-session request, the serviceApp-1 may obtain the session state information 304 and the application state information 306. Once the session state information 304 and the application state information 306 are obtained, the serviceApp-1 may takeover and continue the first call which was previously being managed by the serviceApp-0.

At block 706, the mid-session request may be processed by the second application server instance to manage the communication session based on one of the communication state information and the application state information. For example, the serviceApp-1 may obtain the session state information 304 and the application state information 306, based on which it may process the mid-session request corresponding to first call. In an example, the serviceApp-1 may thereafter generate and transmit response messages to the load balancing engine 212, and eventually to the network 206.

Figure 8:
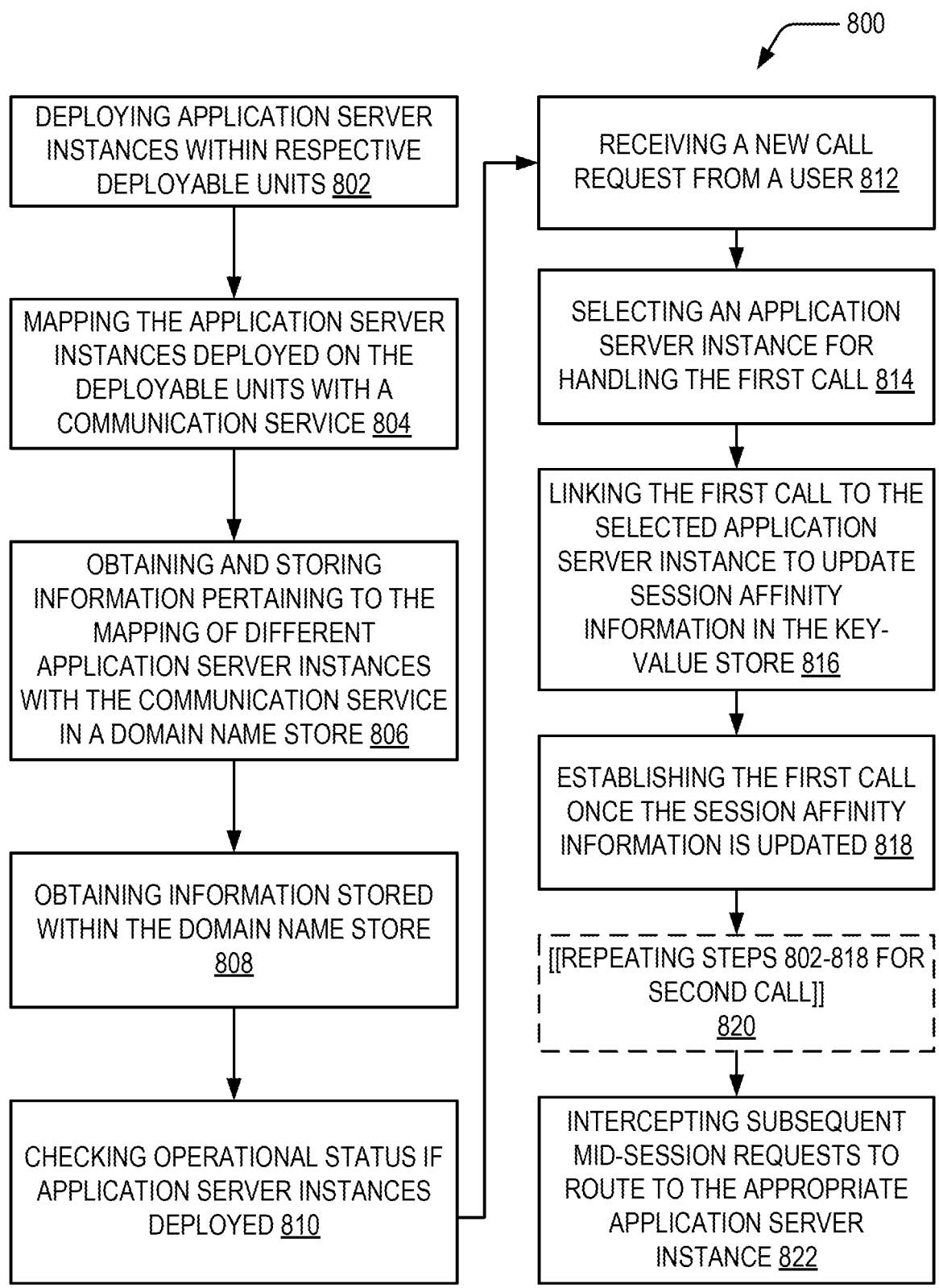

FIG. 8 illustrates a method 800 for implementing a communication session within a cluster computing environment, as per another example. Similar to the method 700, the method 800 may also be implemented through the system 202 within the environment 200. As discussed above, the system 202 may include the load balancing engine 212 which may monitor state of deployable unit 224-1 or deployable unit 224-2 and accordingly determine whether any ongoing communication session may be continued on any one of the available application server instances (e.g., the first instance 220 or the second instance 222). Although discussed in the context of the first instance 220 and the first instance 220 executing on the deployable unit 224-1 and deployable unit 224-2, respectively, such examples would also be applicable for any additional application server instances that may be executing on any other additional deployable units (e.g., pods).

The steps of these methods thus described may pertain to different stages. It is also possible that certain steps of these methods may be performed while others may not be performed for implementing any particular stage. In any case, such examples would still fall within the scope of the claimed subject matter.

At block 802, application server instances may be deployed within respective deployable units. For example, the first instance 220 and the second instance 222 may be implemented or deployed within deployable units 224-1 and 224-2, respectively. In the context of container management platforms, the deployable units 224 may be referred to as pods. The first instance 220 and the second instance 222 may implement and manage various instances of the communication session, as will discussed further.

At block 804, the application server instances deployed on the deployable units may be mapped or associated with a communication service. As a result, the communication service would be provided or implemented through the execution of the application server instances on the respective deployable units. For example, the first instance 220 and the second instance 222 may be mapped to a communication service. In an example, the mapping of the first instance 220 and the second instance 222 to the communication service may be achieved by associating a service name of the service to be implemented with the first instance 220 and the second instance 222. In the present example, the service name may be depicted as serviceApp. In an example, for the communication service with the name serviceApp, the first instance 220 and the second instance 222 may be represented as serviceApp-0 and serviceApp-1.

At block 806, information pertaining to the mapping of different application server instances with the communication service may be obtained and stored in a domain name store maintained with the system. For example, the domain name store 214 stores information which maps or associates the different application server instances and the communication service. In an example, the mapping information may be stored by a cluster computing controller that may be operating within the environment 200. In another example, the mapping information may be stored and available in the form of service records. In yet another example, the service records may further include an IP address which may be mapped to the hostname of the application server instance.

In the context of the example service name serviceApp, the corresponding service records in the domain name store 214 may appear as follows:
  serviceApp-0, Port, HostName (1)
  serviceApp-1, Port, HostName (2)
    serviceApp-0, IP1, . . . (3)
    serviceApp-1, IP2, . . . (4)

At block 808, information stored within the domain name store may be obtained. For example, the load balancing engine 212 may query the domain name store 214 and obtain the service records based on service name, e.g., serviceApp. In response to the query, the domain name store 214 may provide the service records [e.g., the records (1), (2), (3), and (4)] for the service instances that have been registered therein.

At block 810, operational status of application server instances may be checked. For example, the load balancing engine 212 may generate and transmit a protocol message (e.g., SIP OPTION in case of SIP based communication) to deployable unit 224-1 and to deployable unit 224-2. Based on the response message, the load balancing engine 212 may determine whether the first instance 220 and the second instance 222 are active. On determining that the first instance 220 and the second instance 222 are active, the load balancing engine 212 may record the status of the respective application server instance in the key-value store 216.

At block 812, a first call request may be received. For example, the first call request may be received by the system 202, say from any one of the user device(s) 204 through the network 206. The first call, which may be associated with an identifier, may be received by the load balancing engine 212. In an example, the first call may be a result of the communication services that are offered by the system 202.

At block 814, an application server instance for handling the first call may be selected. For example, the load balancing engine 212 may select, for example, the first instance 220 for establishing a communication session. In an example, the load balancing engine 212 may select one of the application server instances based on a predefined logic or based on a round robin mechanism.

At block 816, the first call may be linked to the selected application server instance, and corresponding session affinity information may be updated within the key-value store. As may be understood, session affinity information depicts binding of any communication session to a given resource (e.g., an application server instance). In an example, the load balancing engine 212 may link the first call with the first instance 220, i.e., serviceApp-0 instance of the communication service. In an example, linking may be achieved by associating the identifier of the first call with the service record corresponding to the serviceApp-0. Once the first call is linked with the service records of serviceApp-0, the load balancing engine 212 may update session affinity information 310 in the key-value store 216. Once the session affinity information 310 is updated with information pertaining to the first call, any subsequent requests or messages pertaining to the first call would be directed to the application server instance.

At block 818, once the session affinity information is updated, the first call may be established. For example, once the load balancing engine 212 has updated the session affinity information 310, the load balancing engine 212 may proceed and establish the first call through the serviceApp-0. In an example, once the communication session is established, the serviceApp-0 may write the session state information 304 and the application state information 306 into the key-value store 216.

Block 820 (depicted through a dotted outline) represents one or more of the above-mentioned steps for establishing a second call. Such steps are not being repeated again in the current description for sake of brevity. The same is not be construed as not being within the scope of the claimed subject matter.

For example, a second call (which may be associated with a second identifier) may be received by the load balancing engine 212 which in turn may link the second call with the serviceApp-1. As discussed in conjunction with the example describing the first call, the load balancing engine 212 may update session affinity information in the key-value store 216 based on the linking of the second call and the service records of the serviceApp-1.

At block 822, any subsequent mid-session requests may be received by the load balancing engine and routed to the appropriate application server instance. For example, the load balancing engine 212 may, based on the first identifier obtained from the mid-session request, identify the mid-session request to correspond to the first call. Once details of the first call are determine, the load balancing engine 212 may query the key-value store 216 for the session affinity information 310. On determining from the session affinity information 310 that the first call (i.e., the communication session to which the mid-session request pertains to) is managed by the first instance 220, the load balancing engine 212 may direct the mid-session request to the first instance 220. In a similar manner, the load balancing engine 212 may route the mid-session request for the second call to the second instance 222, i.e., the serviceApp-1.

Figure 9:
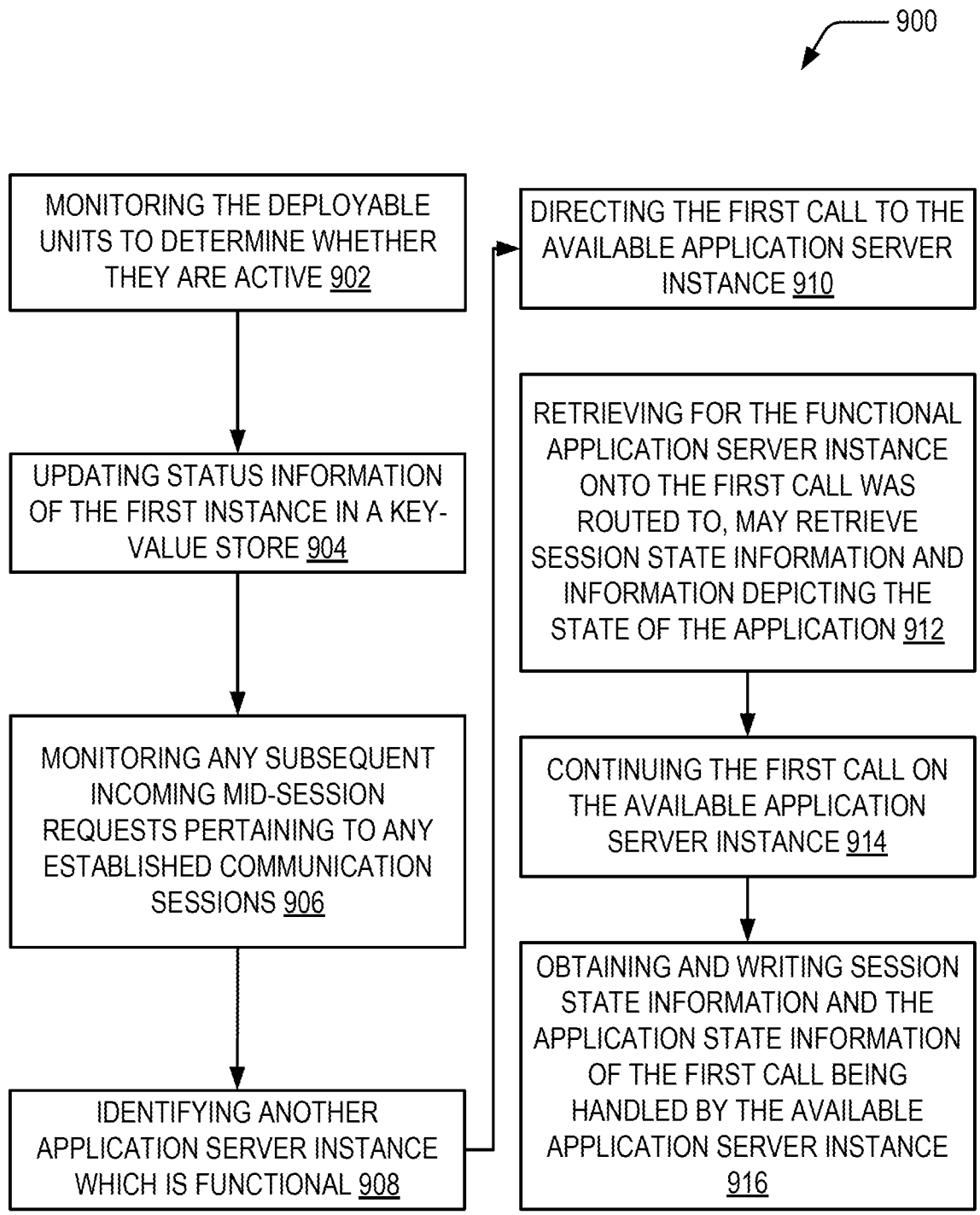

As will be further discussed, the load balancing engine 212 may be used for continuing and supporting an ongoing communication session from one application server instance to another, in the event that the application server instance is no longer available. These and other aspects are discussed in conjunction with FIG. 9, which illustrates a method 900 for implementing a communication session within a cluster computing environment, as per an example, when the application server instance handling the communication session is no longer functional. As described previously, an application server instance may be rendered non-operational owing to a failure of the deployable unit onto which the application server instance may be executing. It may also occur if the deployable unit is terminated for maintenance or in case of a scale-in operation.

At block 902, the deployable units on which the application server instance are executing may be monitored to determine whether the application server instance are active or not. For example, the load balancing engine 212 may transmit certain protocol messages (e.g., SIP OPTION messages in case of SIP-based communication) to the deployable unit 224-1. In the event that no response is received, the load balancing engine 212 may determine that the deployable unit 224-1 (and in turn the first instance 220) is no longer active.

At block 904, status information of the first instance may be updated. For example, on determining that the first instance 220 is no longer available, the load balancing engine 212 may update the status of the first instance 220 in the key-value store 216 in the key-value store 216. In the current example, the load balancing engine 212 may update the status of the first instance 220 as unavailable.

At block 906, any subsequent incoming mid-session requests pertaining to any established communication sessions may be monitored. For example, the load balancing engine 212 may continue monitoring any mid-session requests corresponding to the first call. In an example, load balancing engine 212 may determine that the incoming mid-session request pertains to the first call based on a call identifier. In an example, such a determination may involve the load balancing engine 212 querying its own local cache to ascertain the communication session to which the incoming mid-session request may pertain to.

At block 908, another functional application server instance may be identified. For example, the load balancing engine 212 may determine any other application server instance which may be used for processing the received mid-session request. To this end, the load balancing engine 212 may identify any other application server instance based on a selection parameter. If attributes of such another functional application server instance conform to the selection parameter, the application server instance may be selected. Examples of selection parameter include, but are not limited to, service name of a service implementing the communication session, a predefined policy, hardware configuration of a deployable unit executing the second application server instance, availability of the second application server instance, or a combination thereof. The current example is explained with service name as the selection parameter. For example, the load balancing engine 212 may identify such other application server instance, the service name of which corresponds to the terminated instance, i.e., the serviceApp-0. In an example, the load balancing engine 212 may query its own local cache to identify the second instance 222, i.e., the serviceApp-1 as available for handling the first call and any corresponding mid-session requests.

At block 910, the first call may be directed to the available (i.e., functional) application server instance. For example, once the second instance 222 (i.e., the serviceApp-1) is determined as available, the load balancing engine 212 may direct the first call to the available instance serviceApp-1. To this end, the load balancing engine 212 may rely on location information (e.g., the IP address) of the deployable unit 224-2 onto which the second instance 222 (i.e., the serviceApp-1) is executing.

At block 912, the functional application server instance onto which the first call was routed to, may retrieve session state information and information depicting the state of the application. Such information is obtained from the key-value store. For example, the serviceApp-1 may retrieve the session state information 304 and the application state information 306 corresponding to the first call, from the key-value store 216.

At block 914, the first call may be continued on the available application server instance. For example, based on the session state information 304 and the application state information 306, the serviceApp-1 is able to recreate the communication session context corresponding to the first call. Thereafter, the serviceApp-1 is able to takeover and continue the first call. Any subsequent mid-session request may be routed to the second instance 222 (i.e., the serviceApp-1).

At block 916, session state information and the application state information pertaining to the first call now being handled by the available application server instance is obtained and written to the key-value store. For example, the serviceApp-1 may write the session state information 304 and the application state information 306 corresponding to the first call to the key-value store 216. In an example, the serviceApp-1 may store the session state information 304 and the application state information 306 for the first call in a local cache of the deployable unit 224-2. Storing the session state information 304 and the application state information 306 within the local cache allows the service-App-1 to process any subsequent mid-session requests corresponding to the first call.

Figure 10:
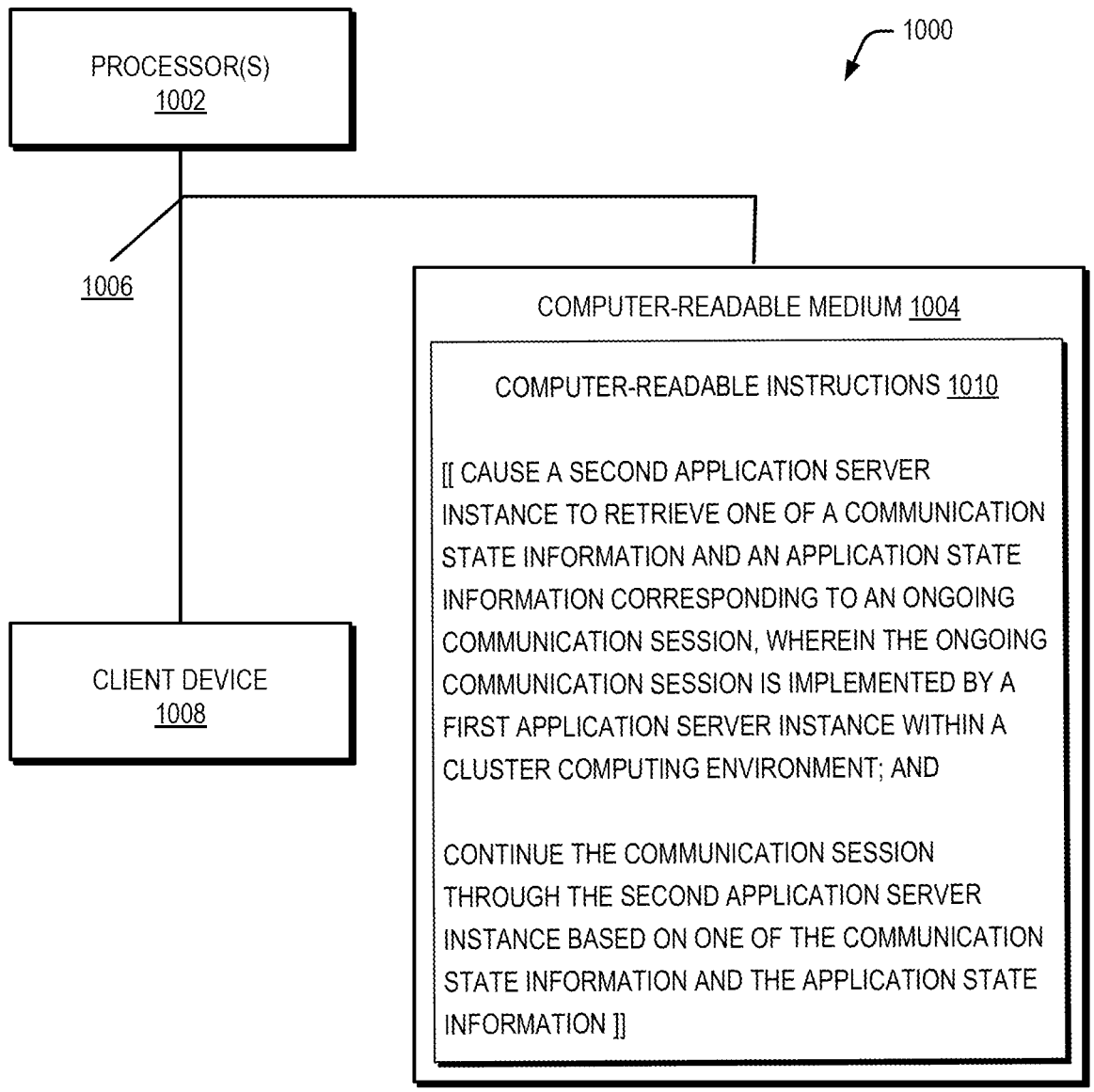
FIG. 10 illustrates a system environment implementing a non-transitory computer readable medium for implementing a communication session within a cluster computing environment, as per an example.

FIG. 10 illustrates a computing environment 1000 implementing a non-transitory computer readable medium for implementing a communication session within a cluster computing environment, as per an example. In an example implementation, the computing environment 1000 may be for example, similar to computing environment 200. In an example, the computing environment 1000 includes processor(s) 1002 communicatively coupled to a non-transitory computer readable medium 1004 through a communication link 1006. The processor(s) 1002 may have one or more processing resources for fetching and executing computer-readable instructions from the non-transitory computer readable medium 1004. The processor(s) 1002 and the non-transitory computer readable medium 1004 may be implemented, for example, in the environment 200.

The non-transitory computer-readable medium 1004 may be, for example, an internal memory device or an external memory device. In an example, the communication link 1006 may be a direct communication link, such as any memory read/write interface. In another example, the communication link 1006 may be an indirect communication link, such as a network interface. The communication link 1006 may be a single network or a combination of multiple networks and may use a variety of different communication protocols.

The processor(s) 1002 and the non-transitory computer-readable medium 1004 may also be communicatively coupled to a client device 1008. The client device 1008 enables the device bearing the processor(s) 1002 and the non-transitory computer-readable medium 1004 to service requests raised by client devices. Referring to FIG. 10, in an example, the non-transitory computer readable medium 1004 includes instruction(s) 1010 that cause the processor(s) 1002 to implement a communication session within a cluster computing environment, such as environment 200. For example, the instructions 1010 may be executed to cause a second application server instance, i.e., the second instance 222, to retrieve one of a session state information 304 and the application state information 306. The session state information 304 and the application state information 306 thus retrieved correspond to an ongoing communication session which was established by a first application server instance, i.e., the first instance 220 within the environment 200.

Based on the session state information 304 and the application state information 306, the second instance 222 is able to continue the communication session. To this end, the second instance 222 is able to create a communication session context for continuing the communication session, which was initially handled and established by the first instance 220. In an example, communication session may include voice communications, video calls, messaging sessions, or combinations thereof.

Although examples for the present disclosure have been described in language specific to structural features and/or methods, it may be understood that the appended claims are not necessarily limited to the specific features or methods described. Rather, the specific features and methods are disclosed and explained as examples of the present disclosure.

The invention claimed is:

1. A system comprising:
a processor; and
a machine-readable storage medium comprising instructions executable by the processor to:
monitor status of a first application server instance executing within a cluster computing environment, wherein the first application server instance is to implement a communication session established using a signaling protocol;
on determining that the first application server instance is non-operational, select a second application server instance; and
cause a mid-session request, received from a communication network, to be directed to the second application server instance, wherein the mid-session request pertains to the communication session; and
cause the second application server instance to process the mid-session request based on one of a communication state information and an application state information corresponding to the communication session implemented by the first application server instance, wherein the communication session is continued to be supported by the second application server instance.

2. The system as claimed in claim 1, wherein the instructions are further executable by the processor to update session affinity information within a key-value store of the cluster computing environment, wherein the session affinity information, when updated, is to associate the communication session with the second application server instance from the first application server instance.

3. The system as claimed in claim 1, the instructions are executable by the processor to select the second application server instance based on a selection parameter, the selection parameter comprising service name of a service implementing the communication session, a predefined policy, hardware configuration of a deployable unit executing the second application server instance, availability of the second application server instance, or a combination thereof.

4. The system as claimed in claim 3, wherein to cause the mid-session request to be directed to the second application server instance, the instructions are executable by the processor to:
determine the selection parameter associated with the first application server instance;
compare the selection parameter with corresponding selection parameters associated with a plurality of application server instances executing within the cluster computing environment; and
identify the second application server instance from amongst the plurality of application server instances on determining that the selection parameter associated with the first application server instance matches the selection parameter associated with the second application server instance.

5. The system as claimed in claim 1, wherein on determining the first application server instance is non-operational, the instructions executable by the processor are to update a status of the first application server instance as unavailable in a key-value store within the cluster computing environment.

6. The system as claimed in claim 5, wherein the key-value store is to store the one of the communication state information and the application state information of the communication session.

7. The system as claimed in claim 1, wherein the instructions executable by the processor are to:
receive a signaling protocol response upon directing the mid-session request to the second application server instance; and
transmit the signaling protocol response to the communication network.

8. The system as claimed in claim 1, wherein the signaling protocol is Session Initiation Protocol.

9. A method comprising:
receiving, by a second application server instance, a mid-session request pertaining to a communication session previously implemented by a first application server instance within a cluster computing environment;
obtaining one of a communication state information and an application state information corresponding to the communication session implemented by the first application server instance; and
processing the mid-session request by the second application server instance to manage the communication session based on one of the communication state information and the application state information.

10. The method as claimed in claim 9, wherein the method comprises:
in response to receiving the mid-session request by the second application server instance, determining whether a session context pertaining to the communication session is present within a local cache of the second application server instance; and
retrieving one of the communication state information and the application state information on determining that the session context is not present within the local cache.

11. The method as claimed in claim 10, wherein the session context is to indicate information pertaining to a state of the communication session, state of an application implementing the communication, or a combination thereof.

12. The method as claimed in claim 9, wherein the method further comprises:
continuing the communication session through the second application server instance; and
updating a key-value store associated with the cluster computing environment with updated communication state information and updated application state information of the communication session, wherein the key-value store when updated associates the updated communication state information and updated application state information with the second application server instance.

13. The method as claimed in claim 12, wherein a copy of the updated communication state information and updated application state information is stored within a local cache of the second application server instance.

14. A non-transitory computer-readable medium comprising computer-readable instructions being executable by a processing resource to:
cause a second application server instance to retrieve one of a communication state information and an application state information corresponding to an ongoing communication session, wherein the ongoing communication session is implemented by a first application server instance within a cluster computing environment; and
continue the communication session through the second application server instance based on one of the communication state information and the application state information.

15. The non-transitory computer-readable medium as claimed in claim 14, wherein the instruction are executable to further:
determine receipt of a mid-session request pertaining to the communication session; and
process the mid-session request by the second application server instance based on one of the communication state information and the application state information.

16. The non-transitory computer-readable medium as claimed in claim 15, wherein the instruction are executable to further:
in response to receiving the mid-session request by the second application server instance, determine whether a session context pertaining to the communication session is present within a local cache of the second application server instance; and
retrieve one of the communication state information and the application state information on determining that the session context is not present within the local cache.

17. The non-transitory computer-readable medium as claimed in claim 16, wherein the session context is to indicate information pertaining to a state of the communication session, state of an application implementing the communication, or a combination thereof.

18. The non-transitory computer-readable medium as claimed in claim 14, wherein the first application server instance and the second application server instance are each implemented within a first deployable unit of computing and a second deployable unit of computing.

19. The non-transitory computer-readable medium as claimed in claim 18, wherein the first deployable unit of computing and the second deployable unit of computing is a pod.

20. The non-transitory computer-readable medium as claimed in claim 14, wherein the instruction are executable to further:
updating a key-value store associated with the cluster computing environment with updated communication state information and updated application state information of the communication session, wherein the key-value store when updated associates the updated communication state information and updated application state information with the second application server instance.

* * * * *